US011835082B2

(12) United States Patent
Karapetian et al.

(10) Patent No.: US 11,835,082 B2
(45) Date of Patent: Dec. 5, 2023

(54) FOLDING ASSEMBLY

(71) Applicant: The Boeing Company, Chicago, IL (US)

(72) Inventors: Michael S. Karapetian, Huntington Beach, CA (US); Hao Lee, Huntington Beach, CA (US)

(73) Assignee: The Boeing Company, Arlington, VA (US)

( * ) Notice: Subject to any disclaimer, the term of this patent is extended or adjusted under 35 U.S.C. 154(b) by 790 days.

(21) Appl. No.: 16/880,447

(22) Filed: May 21, 2020

(65) Prior Publication Data

US 2021/0364020 A1 Nov. 25, 2021

(51) Int. Cl.
*B64C 25/14* (2006.01)
*B64C 25/20* (2006.01)
*F16B 5/06* (2006.01)

(52) U.S. Cl.
CPC .............. *F16B 5/06* (2013.01); *B64C 25/14* (2013.01); *B64C 25/20* (2013.01); *Y10T 74/20* (2015.01)

(58) Field of Classification Search
CPC ......... B64C 25/10; B64C 25/20; B64C 25/12; B64C 25/14; B64C 25/18; B64C 25/26; B64C 2025/125; Y10T 74/20
See application file for complete search history.

(56) References Cited

U.S. PATENT DOCUMENTS

| 4,228,975 A * | 10/1980 | Sealey | B64C 25/14 |
| | | | 244/102 R |
| 5,100,083 A | 3/1992 | Large et al. | |
| 5,337,976 A | 8/1994 | Derrien | |
| 6,824,100 B1 | 11/2004 | Cheetham | |
| 9,272,775 B2 | 3/2016 | Guering | |
| 9,784,347 B2 | 10/2017 | Martyn | |

(Continued)

FOREIGN PATENT DOCUMENTS

| EP | 2822853 A1 | 1/2015 | |
| FR | 2801865 A1 * | 6/2001 | ............ B64C 25/14 |

(Continued)

OTHER PUBLICATIONS

European Extended Search Report and Written Opinion regarding European Patent Application No. 21168011.1 dated Oct. 1, 2021, pp. 9.

*Primary Examiner* — Daniel D Yabut
(74) *Attorney, Agent, or Firm* — Armstrong Teasdale LLP

(57) ABSTRACT

A folding assembly is movable between a collapsed configuration and an extended configuration includes a first rotating link having a first end pivotably coupled to a structural member/frame and a second end. The folding assembly also includes a second rotating link having a first end pivotably coupled to the structural member/frame and a second end. A first connecting link is pivotably coupled between the first rotating link and the second rotating link. A first end of a second connecting link is pivotably coupled to the first rotating link second end. The folding assembly further includes a support link having a first end pivotably coupled to the first rotating link second end and a second end configured to couple to a component to be moved. The support link is configured to selectively move the component between, inclusively, a retracted position and a deployed position.

18 Claims, 5 Drawing Sheets

(56) References Cited

U.S. PATENT DOCUMENTS

| | | |
|---|---|---|
| 2013/0134259 A1 | 5/2013 | Lieven et al. |
| 2014/0175223 A1 | 6/2014 | Durand et al. |
| 2016/0129502 A1 | 5/2016 | Varetti et al. |
| 2016/0236796 A1 | 8/2016 | Piroozmandi |
| 2017/0036404 A1 | 2/2017 | Rengers et al. |
| 2017/0120335 A1 | 5/2017 | DeMuth et al. |
| 2018/0001423 A1 | 1/2018 | Stevenson et al. |
| 2019/0144104 A1 | 5/2019 | Fortier et al. |
| 2019/0240773 A1 | 8/2019 | Carter |
| 2019/0241256 A1 | 8/2019 | Moine et al. |
| 2019/0283867 A1 | 9/2019 | Euzet et al. |

FOREIGN PATENT DOCUMENTS

| | | | |
|---|---|---|---|
| WO | WO-2010139756 A1 * | 12/2010 | ............. B64C 25/14 |
| WO | 2013133839 A1 | 9/2013 | |

* cited by examiner

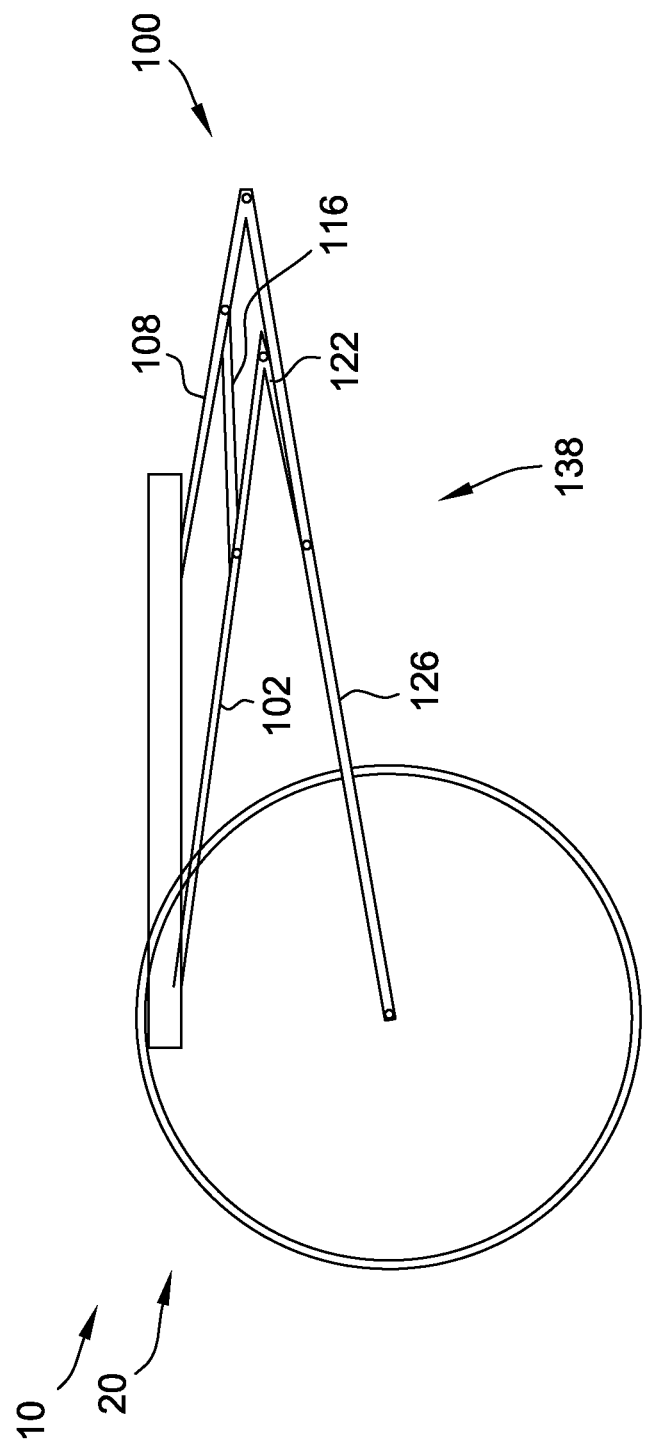

US 11,835,082 B2

FOLDING ASSEMBLY

FIELD

The field of the disclosure relates generally to an assembly for converting motion, and more specifically to a folding assembly for converting motion to displace a first component with respect to a second component.

BACKGROUND

The ability to collapse a component into a smaller volume for storage is highly desired by consumers. For some, the availability of storage space may limit the types or amount of goods the consumer may own. If a product is collapsible into a smaller volume, it will occupy less space in the available area and thus allow for the consumer to require less storage space or the ability for the consumer to store additional goods. Furthermore, at least some goods that include a folding assembly can be adjusted to different heights or lengths based on the required size for a particular consumer. Some known folding assemblies require numerous components that can increase the weight of the assembly beyond what is comfortable for some consumers. Additionally, some known folding assemblies include configurations that only partially collapse and occupy more space than desired even in their collapsed configurations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a folding assembly that is movable between a collapsed configuration and an extended configuration is provided. The folding assembly includes a first rotating link having a first end and a second end, wherein the first end is pivotably coupled to a structural member/frame. The folding assembly also includes a second rotating link comprising a first end and a second end, wherein the second rotating link first end is pivotably coupled to the structural member/frame. A first connecting link is pivotably coupled between the first rotating link and the second rotating link, and a first end of a second connecting link is pivotably coupled to the first rotating link second end. The folding assembly further includes a support link having a first end and a second end, wherein the first end is pivotably coupled to the first rotating link second end, and the support link second end is configured to couple to a component to be moved. The support link is configured to selectively move the component between, inclusively, a retracted position and a deployed position.

In another aspect, a method of assembling a folding assembly is provided. The method includes pivotably coupling a first end of a first rotating link to a structural member/frame and pivotably coupling a first end of a second rotating link to the structural member/frame. The method also includes pivotably coupling a first connecting link between the first rotating link and the second rotating link and pivotably coupling a first end of a second connecting link to the first rotating link second end. The method further includes pivotably coupling a first end of a support link to the second rotating link second end and pivotably coupling a second connecting link second end to the support link. A support link second end is configured to couple to a component to be moved such that the support link is configured to selectively move the component between, inclusively, a retracted position and a deployed position.

BRIEF DESCRIPTION OF THE DRAWINGS

FIG. 5 is a schematic side view of the collapsible system in a retracted position and the folding assembly in a collapsed configuration;

Figure 1:
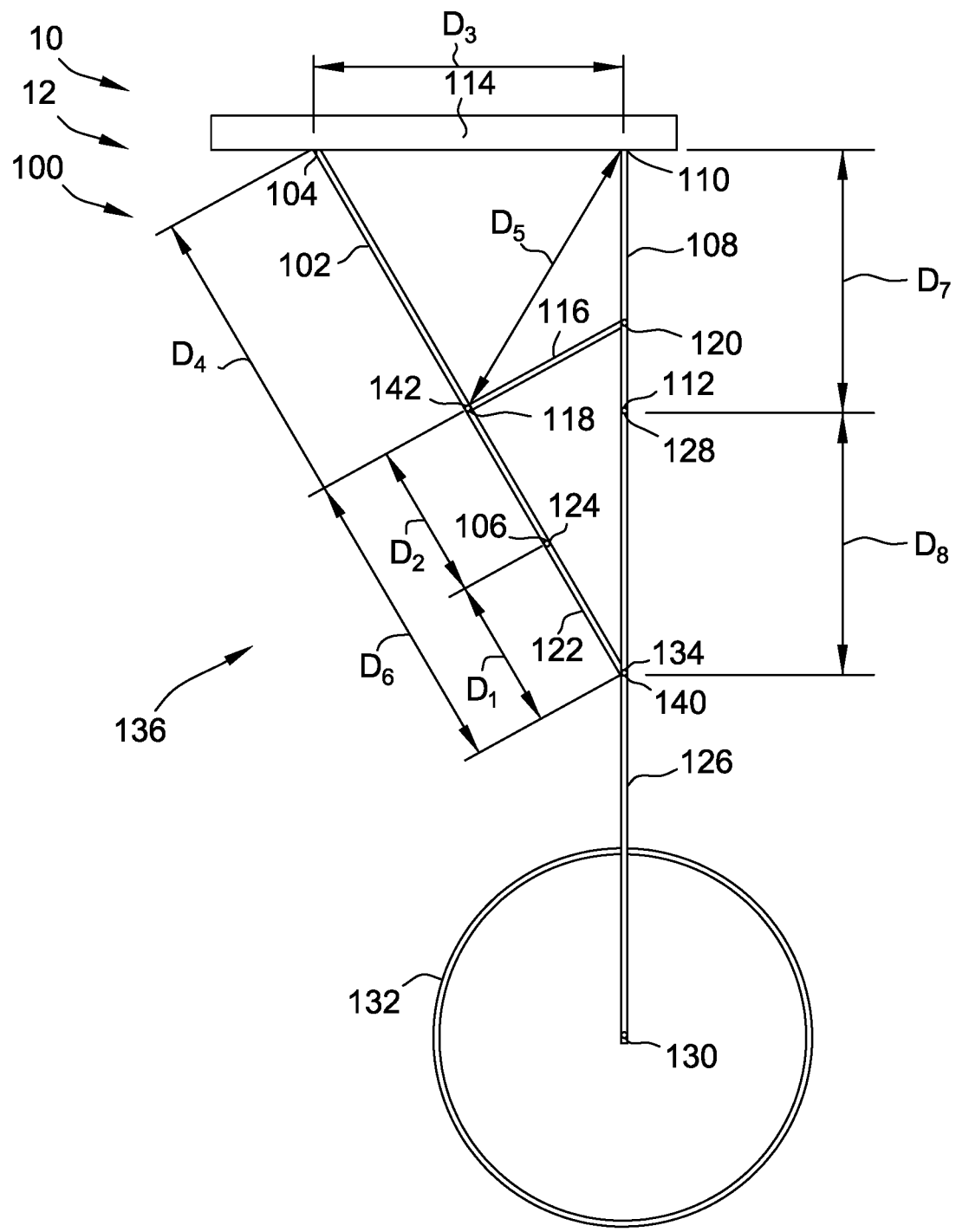
FIG. 1 is a schematic side view of a collapsible system in a deployed position with an exemplary folding assembly in an extended configuration.

Corresponding reference characters indicate corresponding parts throughout the several views of the drawings. Although specific features of various examples may be shown in some drawings and not in others, this is for convenience only. Any feature of any drawing may be referenced and/or claimed in combination with any feature of any other drawing.

DETAILED DESCRIPTION

The implementations described herein relate to a folding assembly is movable between a collapsed configuration and an extended configuration includes a first rotating link having a first end pivotably coupled to a structural member/frame and a second end. The folding assembly also includes a second rotating link having a first end pivotably coupled to the structural member/frame and a second end. A first connecting link is pivotably coupled between the first rotating link and the second rotating link. A first end of a second connecting link is pivotably coupled to the first rotating link second end. The folding assembly further includes a support link having a first end pivotably coupled to the first rotating link second end and a second end configured to couple to a component to be moved. The support link is configured to selectively move the component between, inclusively, a retracted position and a deployed position.

The assemblies and methods described herein facilitate collapsing a folding assembly into a more compact configuration in order to reduce the volume occupied by the collapsible system. The smaller the folding assembly is able to collapse, the less space the collapsible system occupies, which leaves more space available to the user. Generally, the folding assembly described herein may be used in many different industries and requires fewer members than other known folding assemblies. Fewer members require less maintenance and are less expensive to operate and maintain. Furthermore, in embodiments where weight is a concern, fewer members weigh less while still providing sufficient structural support.

Figure 2:
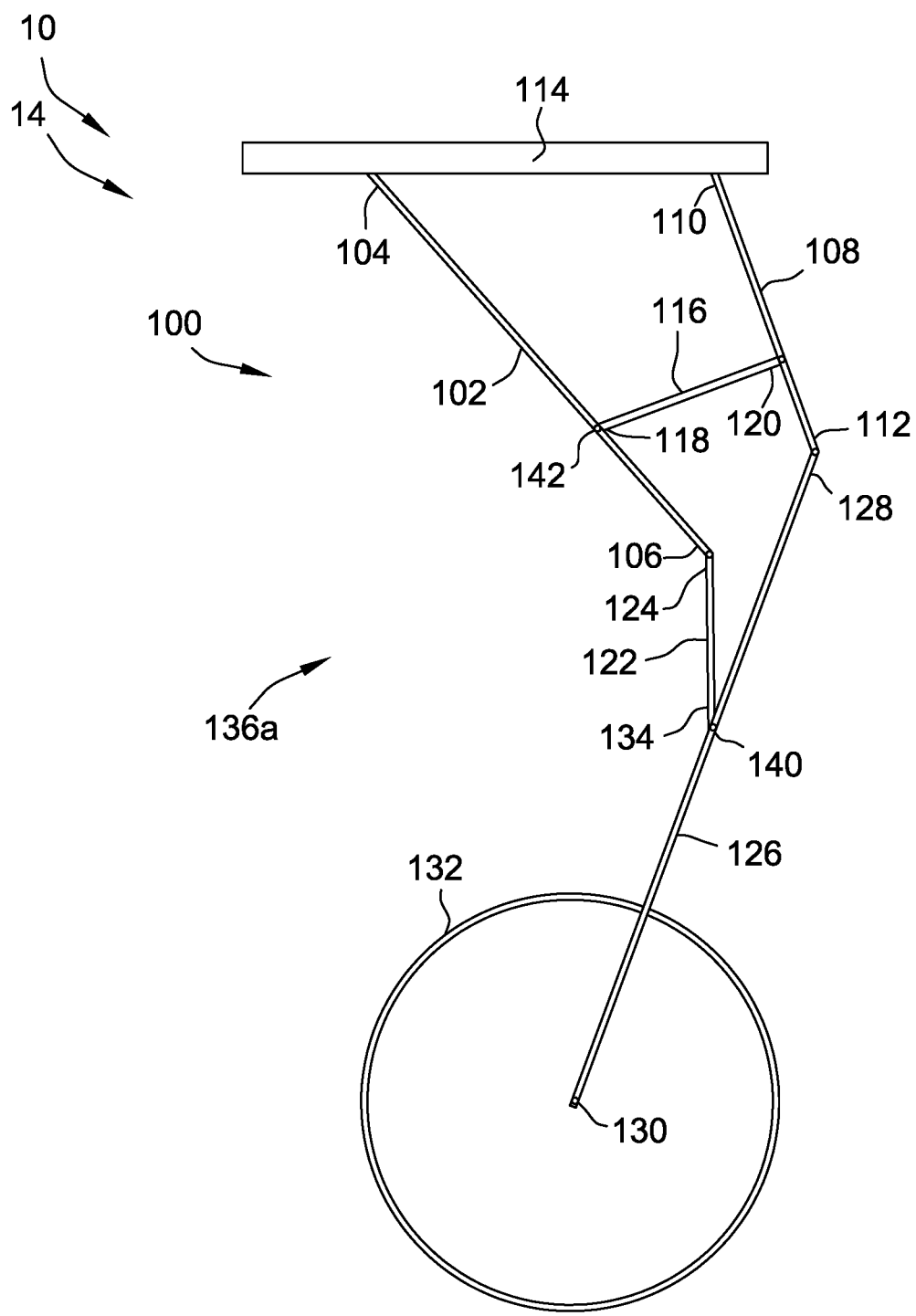
FIG. 2 is a schematic side view of the collapsible system in a first intermediate position and the folding assembly in a first intermediate configuration.
Figure 3:
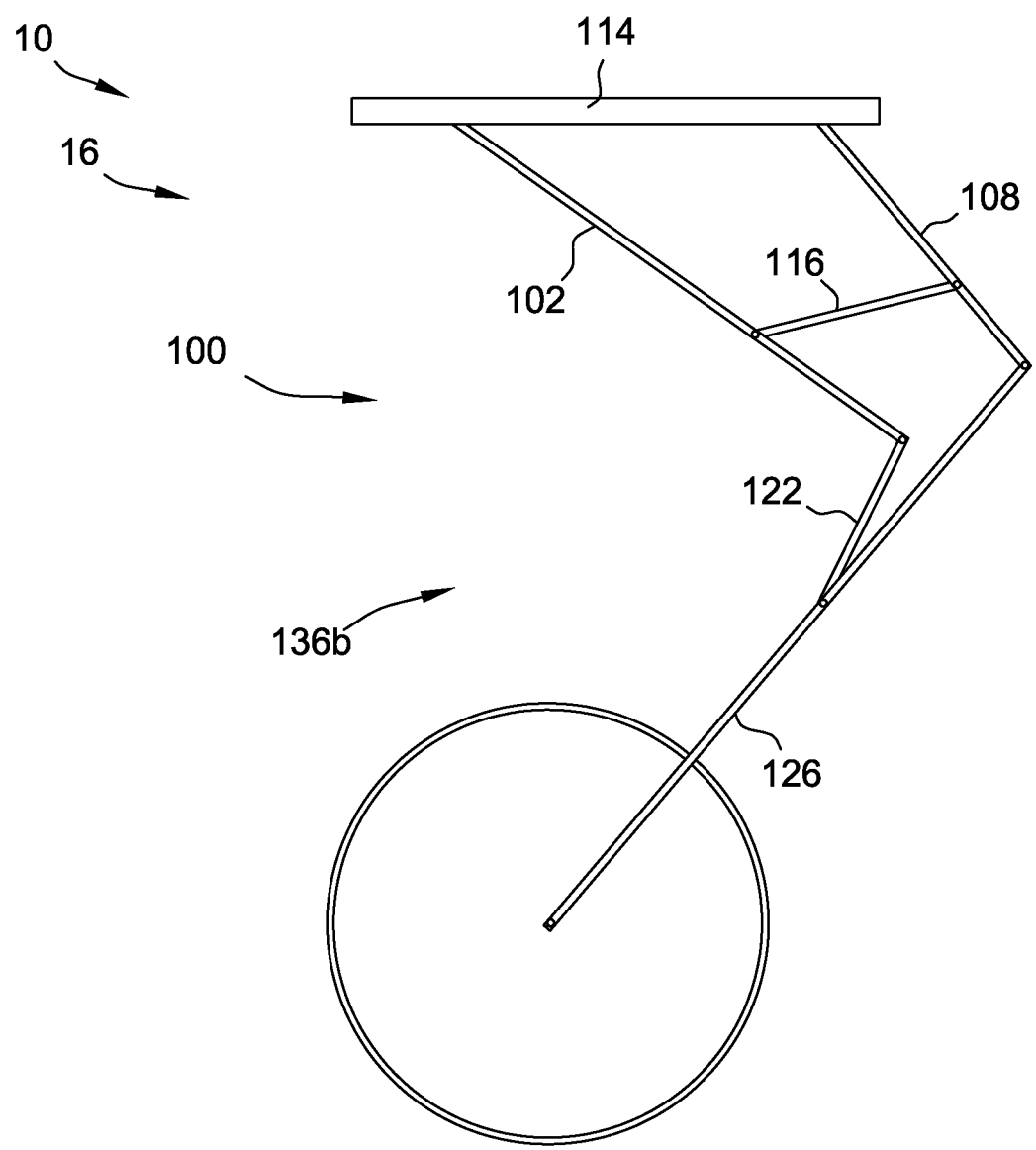
FIG. 3 is a schematic side view of the collapsible system in a second intermediate position and the folding assembly in a second intermediate configuration.
Figure 4:
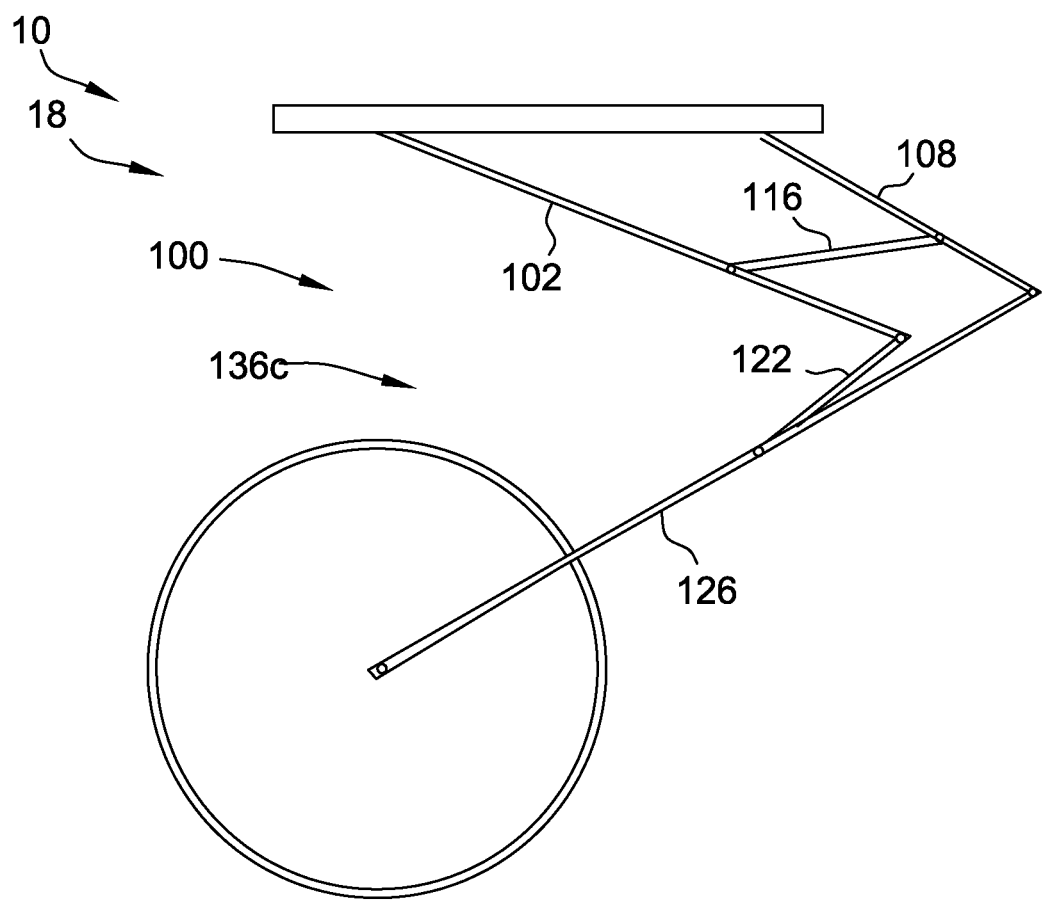
FIG. 4 is a schematic side view of the collapsible system in a third intermediate position and the folding assembly in a third intermediate configuration.

FIG. 1 is a schematic side view of a collapsible system 10 in a deployed position 12 with an exemplary folding assembly 100 in an extended configuration 136. FIG. 2 is a schematic side view of collapsible system 10 in a first intermediate position 14 and folding assembly 100 in a first intermediate configuration 136a. FIG. 3 is a schematic side view of collapsible system 10 in a second intermediate position 16 and folding assembly 100 in a second intermediate configuration 136b. FIG. 4 is a schematic side view of collapsible system 10 in a third intermediate position 18 and folding assembly 100 in a third intermediate configuration 136c. FIG. 5 is a schematic side view of collapsible system 10 in a retracted position 20 and folding assembly 100 in a collapsed configuration 138.

In the exemplary embodiment, collapsible system 10 includes a structural member or frame 114, folding assembly 100 coupled to frame 114, and a component 132 to be moved coupled to folding assembly 100. Although represented in FIGS. 1-5 as a circle, component 132 may be any shape or article and is not limited to the circular shape as shown. As described herein, folding assembly 100 moved between the extended configuration 136 and the collapsed configuration in order to move component 132 from the deployed position 12, when folding assembly 100 is in the extended configuration 136, and the retracted position 20, when folding assembly 100 is in the collapsed configuration 138. Collapsible system 10 may be any system that is able to retract and deploy. For example, collapsible system 10 may include, but it not limited to a vehicle suspension height adjustment system, a compact hydraulic linear jacking system, an awning extension mechanism, a lifting crane arm, an elevator door operation mechanism, a manufacturing assembly robot arm, a satellite dish or radar antenna positioning arm, or an aircraft landing gear assembly. Furthermore, collapsible system 10 may include multiple folding assemblies 100 based on the size of component 132 to be moved.

Folding assembly 100 includes a first rotating link 102 having a first rotating link first end 104 and a first rotating link second end 106. Folding assembly 100 also includes a second rotating link 108 having a second rotating link first end 110 and a second rotating link second end 112. In one embodiment, first rotating link first end 104 and second rotating link first end 110 are pivotably coupled to frame 114.

Folding assembly 100 also includes a first connecting link 116 pivotably coupled between first rotating link 102 and second rotating link 108. Specifically, first connecting link 116 includes a first connecting link first end 118 coupled to first rotating link 102 and a first connecting link second end 120 coupled to second rotating link 108.

A second connecting link 122 of folding assembly 100 includes a second connecting link first end 124 pivotably coupled to first rotating link second end 106. In the exemplary embodiment, folding assembly 100 further includes a support link 126 including a support link first end 128 pivotably coupled to second rotating link second end 112. In one embodiment, a support link second end 130 is coupled to component 132 to be moved. A second connecting link second end 134 is pivotably coupled to support link 126 between support link ends 128 and 130. More specifically, second connecting link second end 134 is coupled to support link 126 at an approximate midpoint 140 of support link 126. As described herein, when a force is applied to component 132 or support link 126, support link 126 selectively moves component 132 between, inclusively, deployed position 12 (as shown in FIG. 1) and retracted position 20 (shown in FIG. 5).

As shown in FIG. 1, in the extended configuration 136, second connecting link 122 extends from first rotating link second end 106 such that second connecting link 122 is aligned with and parallel to first rotating link 102 in the extended configuration 136. Similarly, support link 126 extends from second rotating link second end 112 such that support link 126 is aligned with and parallel to second rotating link 108 in the extended configuration 136.

In the exemplary embodiment, first connecting link 116 is obliquely oriented with respect to at least one of second rotating link 108 and first rotating link 102 in the extended configuration 136. Furthermore, first connecting link second end 120 is coupled second rotating link 108 closer to second rotating link second end 112 than to second rotating link first end 110. Similarly, in the exemplary embodiment, first connecting link first end 118 is coupled first rotating link 102 at a first pivot point 142, which is closer to first rotating link second end 106 than to first rotating link first end 104.

As shown in FIG. 1, in the extended configuration 136, a first distance D1 is defined between second rotating link first end 110 and second rotating link second end 112. A second distance D2 is defined between first rotating link second end 106 and first pivot point 142. In the exemplary embodiment, first distance D1 is substantially similar to second distance D2 to enable folding assembly 100 to fold into the smallest possible volume.

In the exemplary embodiment, first rotating link first end 106 and second rotating link first end 110 define a third distance D3 therebetween. A fourth distance D4 is defined between first rotating link first end 104 and first pivot point 142. In the exemplary embodiment, fourth distance D4 is substantially similar to the third distance D3. Similarly, a fifth distance D5 is defined between second rotating link first end 110 and first pivot point 142 when folding assembly 100 is in the extended configuration 136. The fifth distance D5 is substantially similar to the third distance D3 and to the fourth distance D4. Furthermore, a sixth distance D6 is defined between first pivot point 142 and second connecting link second end 134 is substantially similar to the third distance D3, the fourth distance D4, and the fifth distance D5. In the exemplary embodiment, the third distance D3, the fourth distance D4, and the fifth distance D5 are all substantially similar to enable folding assembly 100 to collapse into a small volume. Furthermore, the substantially equal dimensions of the third distance D3, the fourth distance D4, and the fifth distance D5 prevent restricted movement of folding assembly 100. That is, the substantially equal dimensions of the third distance D3, the fourth distance D4, and the fifth distance D5 enable folding assembly 100 to move between the extended configuration 136 and the collapsed configuration 138.

In the exemplary embodiment, second rotating link first end 110 and second rotating link second end 112 define a seventh distance D7 that is substantially similar to an eighth distance D8 defined between support link first end 128 and midpoint 140 of support link 126. As described herein, the distances and lengths of various links of folding assembly 100 enable folding assembly to collapse into a smaller volume than other collapsible configurations while also requiring fewer links. Specifically, in one embodiment, links 102, 108, 116, 122, and 126 are the only member links of folding assembly 100.

Links 102, 108, 116, 122, and 126 can be made from any material and may be any structure, such as, but not limited to tubular, cylindrical rods, or flat bars. Furthermore, in the exemplary embodiment, each link 102, 108, 116, 122, and 126 is rigid and does not bend. In another embodiment, each link 102, 108, 116, 122, and 126 is slightly flexible, but does not plastically deform. That is, each link 102, 108, 116, 122, and 126 remains linear in the extended configuration 136, intermediate configurations 136a, 136b, and 136c, and the collapsed configuration 138.

In the exemplary embodiment, the ends of each link 102, 108, 116, 122, and 126 may include openings through which a fastener, such as but not limited to, a pin is inserted. In another embodiment, one end of a link 102, 108, 116, 122, and 126 may include a fastener formed thereon that is inserted through an opening in an end of a link 102, 108, 116, 122, or 126 to be coupled therewith. Generally, links 102, 108, 116, 122, and 126 of folding assembly 100 may be coupled to one another by any known means that facilitates operation of folding assembly 100 as described herein.

As described herein, folding assembly 100 allows for links to be placed in closer proximity to each other thus allowing for a more compact volume into which folding assembly 100 occupies.

In some embodiments, as shown in FIGS. 1-5, first rotating link first end 104 and second rotating link first end 110 are aligned vertically such that an imaginary line connecting first rotating link first end 104 and second rotating link first end 110 is perpendicular to second rotating link 108 in the extended configuration. In other embodiments, first rotating link first end 104 and second rotating link first end 110 are vertically offset. In some such embodiments, the amount of vertical offset between first rotating link first end 104 and second rotating link first end 110 is based on the size of component 132 coupled to support link second end 130. The larger component 132 is, the larger the offset is likely to be to allow folding assembly 100 to collapse into a small volume.

In order to transition from the extended configuration 136 to the collapsed configuration 138 (shown in FIG. 5), a force is acted upon collapsible system 10. In one embodiment, the force acts on component 132. In another embodiment, the force acts upon one or more links of folding assembly 100. For example, the force may act upon first rotating link 102 toward first rotating link second end 106. In another embodiment, the force may act upon support link 126. Generally, the force may act on link of folding assembly 100. In one embodiment, the force may be caused by a user directly manipulating one of links 102, 108, 116, 122, and 126. In another embodiment, a force application device, such as but not limited to, an actuator may be coupled to one of links 102, 108, 116, 122, and 126 and initiate transitioning between the extended configuration 136 and the collapsed configuration 138.

As shown in FIG. 2, in the first intermediate configuration, both first rotating link 102 and second rotating link 108 rotate in the same direction about their respective first ends 104 and 110 with respect to frame 114. First connecting link 116, being coupled between first rotating link 102 and second rotating link 108, causes first rotating link 102 and second rotating link 108 to move together at the same time and at the same rate. As second ends 106 and 112 of first rotating link 102 and second rotating link 108, respectively, move in one direction, second ends 134 and 130 of second connecting link 122 and support link 126 move in the opposite direction. Specifically, second connecting link 122 rotates with respect to first rotating link 102 and support link 126 rotates with respect to second rotating link 108. As support link second end 130 moves, it causes component 132 to begin moving toward frame 114 and also away from first rotating link second end 106.

FIGS. 3 and 4 illustrate the progression of folding assembly 100 along second intermediate configuration 136b and third intermediate configuration 136c. FIG. 5 illustrates the collapsed configuration 138 of folding assembly 100 and the retracted position 20 of collapsible system 10. In the exemplary embodiment, component 132 is relatively large and is positioned adjacent frame 114. In other embodiments, such as in embodiments where component 132 is a thin sheet of an awning, or if frame 114 is configured to allow a portion of component 132 to extend therethrough, folding assembly 100 will collapse further and occupy less volume. In a fully collapsed configuration 138, links 102, 108, 116, 122, and 126 are substantially parallel to each other and oriented parallel to frame 114. As described herein, the collapsed configuration 138 is based at least in part on the size and configuration of component 132 and frame 114.

The implementations described herein relate to a folding assembly is movable between a collapsed configuration and an extended configuration includes a first rotating link having a first end pivotably coupled to a structural member/frame and a second end. The folding assembly also includes a second rotating link having a first end pivotably coupled to the structural member/frame and a second end. A first connecting link is pivotably coupled between the first rotating link and the second rotating link. A first end of a second connecting link is pivotably coupled to the first rotating link second end. The folding assembly further includes a support link having a first end pivotably coupled to the first rotating link second end and a second end configured to couple to a component to be moved. The support link is configured to selectively move the component between, inclusively, a retracted position and a deployed position.

The assemblies and methods described herein facilitate collapsing a folding assembly into a more compact configuration in order to reduce the volume occupied by the collapsible system. The smaller the folding assembly is able to collapse, the less space the collapsible system occupies, which leaves more space available to the user. Generally, the folding assembly described herein may be used in many different industries and requires fewer members than other known folding assemblies. Fewer members require less maintenance and are less expensive to operate and maintain. Furthermore, in embodiments where weight is a concern, fewer members weigh less while still providing sufficient structural support.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and preceded by the word "a" or "an" should be understood as not excluding plural elements or steps unless such exclusion is explicitly recited. Furthermore, references to "one embodiment" of the present invention or the "example embodiment" are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A folding assembly movable between a collapsed configuration and an extended configuration, the folding assembly comprising:
   a first rotating link comprising a first end and a second end, wherein the first end is pivotably coupled to a structural member/frame;
   a second rotating link comprising a first end and a second end, wherein the second rotating link first end is pivotably coupled to the structural member/frame;
   a first connecting link pivotably coupled between the first rotating link and the second rotating link;
   a second connecting link comprising a first end and a second end, wherein the second connecting link first end is pivotably coupled to the first rotating link second end;
   a support link comprising a first end and a second end, wherein the first end is pivotably coupled to the second rotating link second end, and the support link second end is configured to couple to a component to be moved, wherein the support link is configured to selectively move the component between, inclusively, a retracted position and a deployed position, and
   each of the first and second rotating links, first and second connecting links, and support link remains linear in the collapsed configuration, the extended configuration, and intermediate configurations therebetween.

2. The folding assembly in accordance with claim 1, wherein the first rotating link is colinear with the second connecting link in the extended configuration.

3. The folding assembly in accordance with claim 1, wherein the second rotating link is colinear with the support link in the extended configuration.

4. The folding assembly in accordance with claim 1, wherein the first connecting link is obliquely oriented with respect to at least one of the first rotating link and the second rotating link in the extended configuration.

5. The folding assembly in accordance with claim 1, wherein the second connecting link second end is coupled to the support link at an approximate midpoint of the support link.

6. The folding assembly in accordance with claim 1, wherein the first connecting link second end is coupled the second rotating link closer to the second rotating link second end than to the second rotating link first end.

7. The folding assembly in accordance with claim 1, wherein a first connecting link first end is coupled the first rotating link at a first pivot point, which is closer to the first rotating link second end than to the first rotating link first end.

8. The folding assembly in accordance with claim 7, wherein a first distance is defined between the second connecting link first end and the second connecting link second end, and wherein a second distance is defined between the first rotating link second end and the first pivot point, wherein the first distance is substantially similar to the second distance.

9. The folding assembly in accordance with claim 7, wherein the first rotating link first end and the second rotating link first end define a third distance therebetween, and wherein a fourth distance defined between the first rotating link first end and the first pivot point is substantially similar to the third distance.

10. The folding assembly in accordance with claim 1, wherein the second rotating link first end and the second rotating link second end define a distance that is substantially similar to a distance defined between the support link first end and a midpoint of the support link.

11. The folding assembly in accordance with claim 9, wherein a fifth distance defined between the second rotating link first end and the first pivot point is substantially similar to the third distance and the fourth distance, and wherein a sixth distance is defined between the first pivot point and the second connecting link second end is substantially similar to the third distance, the fourth distance, and the fifth distance.

12. A method of assembling a folding assembly that is movable between a collapsed configuration and an extended configuration, the method comprising:
   pivotably coupling a first end of a first rotating link to a structural member/frame;
   pivotably coupling a first end of a second rotating link to the structural member/frame;
   pivotably coupling a first connecting link between the first rotating link and the second rotating link; pivotably coupling a first end of a second connecting link to the first rotating link second end;
   pivotably coupling a first end of a support link to the second rotating link second end;
   pivotably coupling a second connecting link second end to the support link, wherein a support link second end is configured to couple to a component to be moved such that the support link is configured to selectively move the component between, inclusively, a retracted position and a deployed position, and
   each of the first and second rotating links, first and second connecting links, and support link remains linear in the collapsed configuration, the extended configuration, and intermediate configurations therebetween.

13. The method in accordance with claim 12, wherein the first rotating link is colinear with the second connecting link in the extended configuration, and wherein the second rotating link is colinear with the support link in the extended configuration.

14. The method in accordance with claim 12, wherein the second connecting link second end is coupled to the support link at an approximate midpoint of the support link.

15. The method in accordance with claim 12, wherein the first connecting link second end is coupled the second rotating link closer to the second rotating link second end than to the second rotating link first end, and wherein the first connecting link first end is coupled the first rotating link at a first pivot point, the first pivot point being closer to the first rotating link second end than to the first rotating link first end.

16. The method in accordance with claim 15, wherein a first distance is defined between the second connecting link first end and the second connecting link second end, and wherein a second distance is defined between the first rotating link second end and the first pivot point, wherein the first distance is substantially similar to the second distance.

17. The method in accordance with claim 15, wherein the first rotating link first end and the second rotating link first end define a third distance therebetween;
   wherein a fourth distance is defined between the first rotating link first end and the first pivot point;
   wherein a fifth distance is defined between the second rotating link first end and the first pivot point; and wherein a sixth distance is defined between the first pivot point and the second connecting link second end, the third distance, the fourth distance, the fifth distance and the sixth distance all being substantially similar to each other.

18. The method in accordance with claim 12, wherein the second rotating link first end and the second rotating link second end define a distance that is substantially similar to a distance defined between the support link first end and a midpoint of the support link.

* * * * *